(12) United States Patent
Hillhouse

(10) Patent No.: US 6,435,782 B1
(45) Date of Patent: Aug. 20, 2002

(54) TOOL FOR REMOVAL OF LARGE BOLTS

(76) Inventor: Darrell Hillhouse, P.O. Box 390591, Anza, CA (US) 92539

( * ) Notice: Subject to any disclaimer, the term of this patent is extended or adjusted under 35 U.S.C. 154(b) by 0 days.

(21) Appl. No.: 09/664,309

(22) Filed: Sep. 18, 2000

(51) Int. Cl.[7] .......................... B23B 49/02; B23P 11/00
(52) U.S. Cl. ................ 408/72 B; 29/402.03; 29/426.4; 408/79; 408/84
(58) Field of Search .......................... 408/72 R, 72 B, 408/24 B, 115 R, 115 B, 1 R, 79, 84; 29/402.03, 402.08, 426.4

(56) References Cited

U.S. PATENT DOCUMENTS

| | | | |
|---|---|---|---|
| 2,165,485 A | * | 7/1939 | Jackman ................... 29/426.4 |
| 2,391,405 A | * | 12/1945 | Fuglie ...................... 408/72 B |
| 2,547,986 A | * | 4/1951 | Van Dermark ........... 29/402.03 |
| 2,670,639 A | * | 3/1954 | Flowers et al. .......... 29/402.03 |
| 4,831,902 A | * | 5/1989 | McClure ................... 29/426.4 |
| 5,388,933 A | | 2/1995 | Dunbar |
| 5,649,791 A | | 7/1997 | Connolly |
| 5,758,996 A | | 6/1998 | Loudon |
| 5,820,314 A | | 10/1998 | Dunbar |
| 5,989,025 A | | 11/1999 | Conley |

* cited by examiner

Primary Examiner—Steven C. Bishop
(74) Attorney, Agent, or Firm—Joseph E. Mueth

(57) ABSTRACT

A tool for centering a drill or punch on the broken face of a large stud or bolts and for using the tool to break up and remove a large stud or bolt which comprises a collar having a central bore therethrough having a first portion threaded to mate with the stud or bolt threads and a second portion bored to just slide over the stud or bolt threads and an externally threaded cylindrical shaft which is threadably receivable in the collar, said threads being similar to those of the broken stud or bolt, the shaft having extending longitudinally therethrough a plurality of off-center holes, from 3 to about 9 holes, preferably said holes are three in number, are displaced from each by 120°, and are equidistant from the center and the inside of said external threads, said holes being adapted to slidably receive an alignment pin or drill bit.

9 Claims, 4 Drawing Sheets

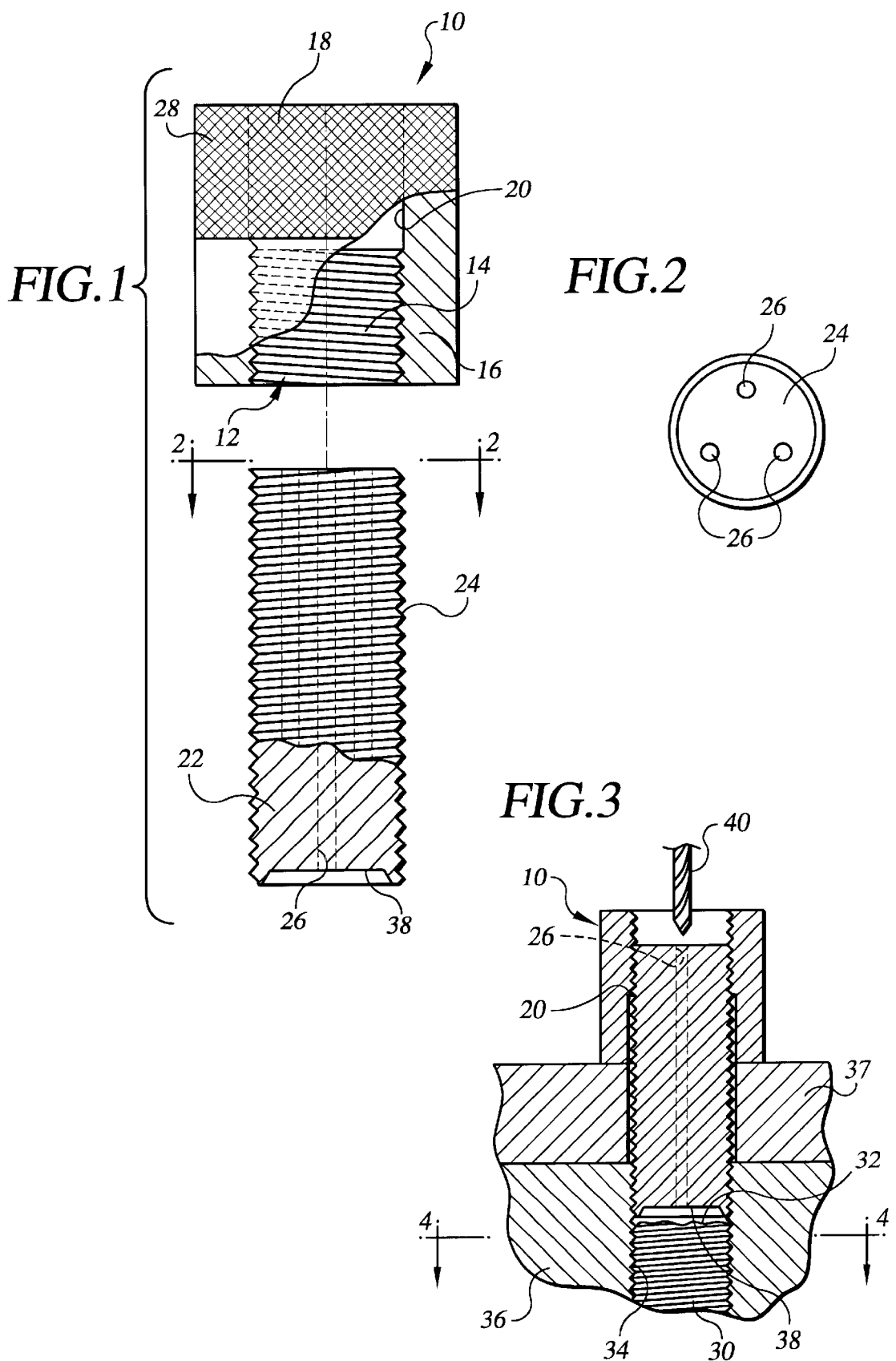

TOOL FOR REMOVAL OF LARGE BOLTS

BACKGROUND OF THE INVENTION

The studs and bolts used in a wide variety of machinery application usually have a head and a threaded portion or shank. The head is prone to breaking off due to wear and tear or accident. When a stud bolt breaks off, it leaves, in the threaded bore, a threaded portion which must be removed prior to insertion of a new stud or bolt. It has been the practice to remove the threaded remaining portion by drilling into the broken face of the stud or bolt, then driving or screwing an extractor into the drilled hole to engage the stud or bolt remnant and, then, by turning the extractor to unscrew the remnant from the hole.

In the case of small broken studs or bolts, it is highly desirable that the hole be drilled axially for several reasons. First, drilling an off-center hole may damage the bore threads. Second, an axial hole may prevent extractor breakage. An axial hole allows use of the largest possible drill, without damaging the threads, which, in turn, allows use of the largest possible extractor.

Studs and bolts break off in a variety of positions: far into the bore, in the bore near the orifice, at a threaded portion outside the bore, at a shank portion outside the bore or in the larger bore of an attached captive piece.

The typical rough and slanted broken face of a stud or bolt makes drilling an axial hole difficult and consequently several tools have been shown in the prior art for guiding of a center punch and/or drill into engagement with the broken face of a stud or bolt regardless of the location of the break. Examples of such tools are shown in Dunbar U.S. Pat. No. 5,388,933 and Dunbar U.S. Pat. No. 5,820,314 which show a tool for preparing broken studs and bolts for extraction by screw extractors. This tool acts as a guide for centering a center punch and/or drill on the broken face of a stud or bolt. The tool has a nut or collar and a shaft. The nut has a central bore therethrough having a first portion threaded to mate with the stud or bolt threads and a second portion bored to just slide over the stud threads. The shaft has a cylindrical shaft having a first end and a second end and an axial bore therethrough. The shaft includes a first externally threaded portion extending from the shaft first end of threads similar to those of the broken stud. The axial bore in the shaft provides access for drilling an axial hole in the broken face of the stud or bolt.

The provision of an axial hole in the face of a broken stud or bolt is effective for removing a small stud or bolt on the order of one-half inch or less in diameter. However, tools which provide an axial hole in the face are inadequate for the removal of larger studs and bolts. Drilling a center hole in a large stud or bolt face is generally ineffectual since it is difficult or impossible subsequently to apply enough torque to twist the remnant due to the presence of accumulated rust and corrosion.

SUMMARY OF INVENTION

A tool for centering a drill or punch on the broken face of a large stud or bolts and for using the tool to break up and remove a large stud or bolt which comprises a collar having a central bore therethrough having a first portion threaded to mate with the stud or bolt threads and a second portion bored to just slide over the stud or bolt threads and an externally threaded cylindrical shaft which is threadably receivable in the collar, said threads being similar (that is, of the same size and thread pitch) to those of the broken stud or bolt, the shaft having extending longitudinally therethrough a plurality of off-center holes. The minimum number of off-center holes is three. However, more such holes, preferably in an approximately symmetrical array, up to about nine off-center holes, are used for the removal of very large stud or bolts having a diameter of 3 inches or more. Preferably said off-center holes are three in number, are displaced from each by 120°, and are equidistant from the center and the inside of said external threads, said holes being adapted to slidably receive an alignment pin or drill bit.

In another aspect, the invention includes the method of removing a large broken stud or bolt from a bore by placing the collar having a central bore therethrough having a first portion threaded to mate with the stud or bolt threads and a second portion bored to just slide over the stud or bolt threads over a broken bolt having a face protecting above the surrounding surface, said bolt having exposed threads, inserting an externally threaded shaft into said collar, said shaft having a plurality of approximately symmetrically arrayed off-center longitudinal holes therethrough, slidably inserting a drill bit through one of said holes and drilling into the face of said bolt, inserting an alignment pin in the first hole drilled, and then drilling additional holes into the face of the bolt through other of the off-center holes, removing said collar and shaft, enlarging the drilled holes, and inserting a punch into the bolt to break up the remains of the bolt to collapse the remains, and removing the remains.

The invention further includes the method of removing a large broken stud or bolt from a bore by placing the collar having a central bore therethrough having a first portion threaded to mate with the stud or bolt threads and a second portion bored to just slide over the stud or bolt threads over a broken bolt having a face protecting above the surrounding surface, said bolt having an exposed smooth shank, inserting an externally threaded shaft into said collar, said shaft having three longitudinal holes therethrough, slidably inserting a drill bit through one of said holes and drilling into the face of said bolt, inserting an alignment pin in the first hole drilled, and then drilling the second and third holes into the face of the bolt, removing said collar and shaft, enlarging the three drilled holes, and inserting a punch into the bolt to break up the remains of the bolt to collapse the remains, and removing the remains.

The invention still further includes the method of removing a large broken stud or bolt from a bore by placing the collar having a central bore therethrough having a first portion threaded to mate with the stud or bolt threads and a second portion bored to just slide over the stud or bolt threads over a broken bolt having a face recessed below the surrounding surface, inserting an externally threaded shaft into said collar, said shaft having three longitudinal holes therethrough, slidably inserting a drill bit through one of said holes and drilling into the face of said bolt, inserting an alignment pin in the first hole drilled, and then drilling the second and third holes into the face of the bolt, removing said collar and shaft, enlarging the three drilled holes, and inserting a punch into the bolt to break up the remains of the bolt to collapse the remains, and removing the remains.

In another embodiment, the invention includes the method of removing a large broken stud or bolt from a bore by placing the collar having a central bore therethrough having a first portion threaded to mate with the stud or bolt threads and a second portion bored to just slide over the stud or bolt threads over a broken bolt having a face essentially flush with the surrounding surface, inserting an externally threaded shaft into said collar, said shaft having three longitudinal holes therethrough, slidably inserting a drill bit through one of said holes and drilling into the face of said bolt, inserting an alignment pin in the first hole drilled, and then drilling the second and third holes into the face of the bolt, removing said collar and shaft, enlarging the three drilled holes, and inserting a punch into the bolt to break up the remains of the bolt to collapse the remains, and removing the remains.

DESCRIPTION OF THE DRAWINGS

Turning to the drawings.

FIG. 1 is a side view in partial section of the collar (upper) and shaft (lower) elements of this invention.

FIG. 2 is an end view of the shaft taken along the line 2—2 in FIG. 1.

FIG. 3 shows, in section, the shaft and collar in place as used to remove a broken bolt or stud where the break has occurred below the surrounding surface so that the bolt face is recessed.

DESCRIPTION OF PREFERRED EMBODIMENTS

Figure 4A:
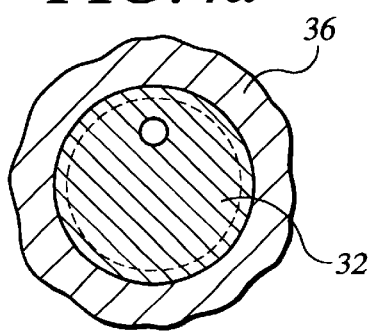
FIGS. 4a through 4g shows the sequence of steps normally used to drill out, break up and remove a broken bolt using the collar and shaft according to this invention.
Figure 4B:
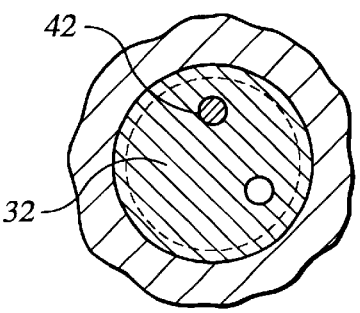
Figure 4C:
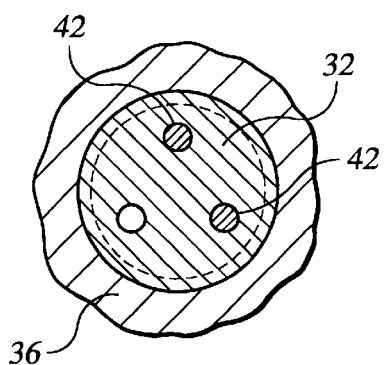
Figure 4D:
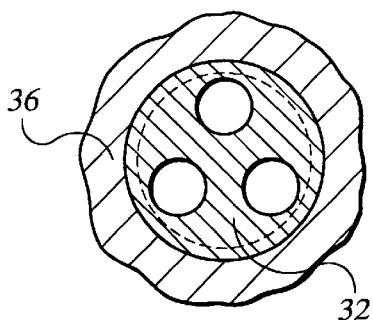
Figure 4E:
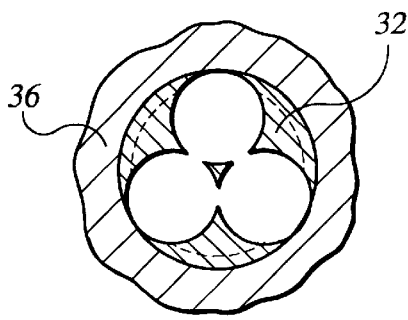

Turning to the drawings in more detail, considering FIGS. 1 and 2 the collar 10 has a center bore 12 running from end to end. The first portion 14 of bore 12 has internal threads 16. The second portion 18 has smooth inside walls 20.

The cylindrical shaft 22 is provided with external threads 24 and three internal holes 26 running longitudinally through the shaft 22. The holes 26 are spaced 120° apart and located half way between the center or axis of shaft 22 and the inside extremity of threads 24.

The external threads 24 on shaft 22 are adapted to make-up with the internal threads 16 on the collar 10.

The exterior of the second portion 18 of collar 10 has a knurled finish 28 to provide a finger grip.

Considering the use of the collar and shaft 4 assembly, FIG. 3 shows the use of the device to remove a broken bolt 30 where the bolt face 32 of the broken bolt is recessed within a bore 34 in member 36. The bolt, prior to having its head broken off, held member 37 to member 36. The collar and shaft are arranged as shown with the threads 24 on the shaft 22 being made up with the female threads lining bore 34. The shaft 22 is thus centered over the bolt face 32. Preferably, the end of shaft 22 is provided with a cutout or concave surface 38 to allow for any upwardly projecting burrs or surface irregularities on bolt face 32.

The holes 26 are adapted to receive drill bit 40.

To break up and remove broken bolt 30, the sequence of steps typically is as shown in FIGS. 4a to 4g. Using drill 40, a first hole is drilled into and through bolt face 32, FIG. 4a. Then, an alignment pin 42 can optionally be inserted in the first hole and a second hole is drilled into and through bolt face 32, FIG. 4b. A third hole is drilled, in face 32, FIG. 4c. Then the shaft and collar assembly are removed and the three holes in bolt face 32 are drilled out using drill bits of increasing diameter to enlarge the holes in bolt face 32, FIGS. 4d and 4e.

Figure 4F:
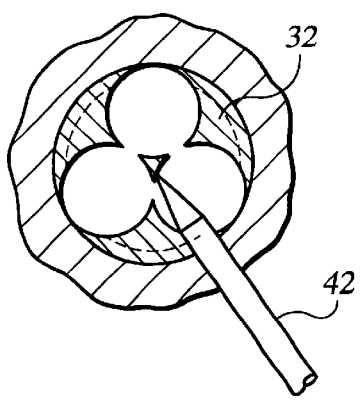
Figure 4G:
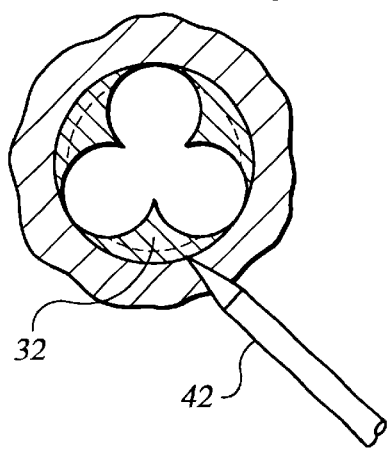

Then, alignment pin 42 or other hard tool is used to knock or punch out the remaining material at the center of bolt face 32, FIG. 4f, which tends to break the broken bolt into three pieces which collapse toward the center of the bore, FIG. 4g. At this point, the three broken pieces can be grasped with a pincers and simply pulled cleanly out of the hole.

Figure 5:
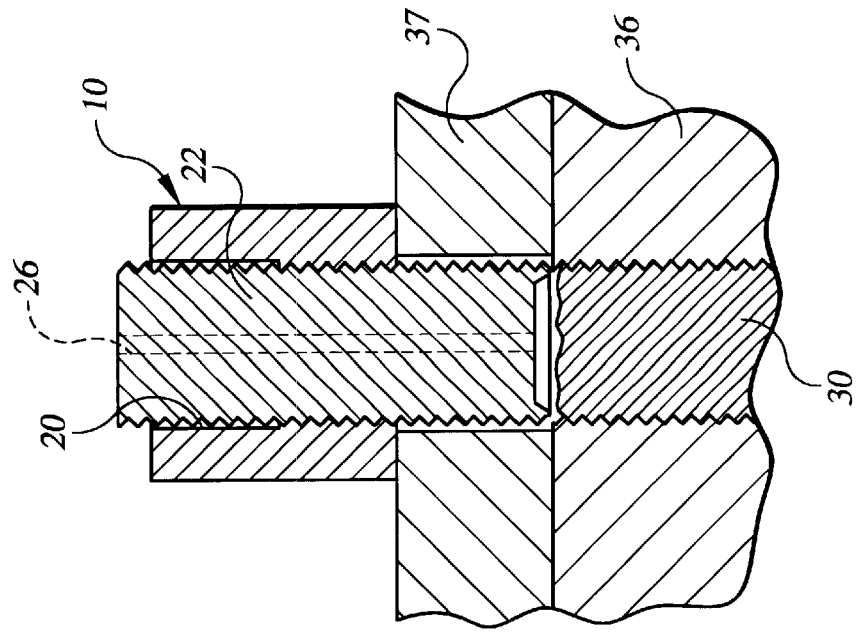
FIG. 5 shows, in section, the use of the shaft and collar to remove a bolt which has broken off above the surrounding surface, that is, leaving the broken face raised.

Numerous variations are possible. In many cases, the bolt is broken off, leaving a raised remnant as shown in FIG. 5. The collar 10 can be threaded over the remnant. However, if the remnant has an insufficient number of exposed threads or if the threads are damaged, or if the projecting bolt remnant does not have threads, then the collar 10 can be turned end-for-end and the second portion having smooth inside walls 20 can be slipped over the remnant, and the shaft 22 can be threaded into the internally threaded first portion 14 of collar 10. Thereafter, the tool is used as previously described.

Figure 6:
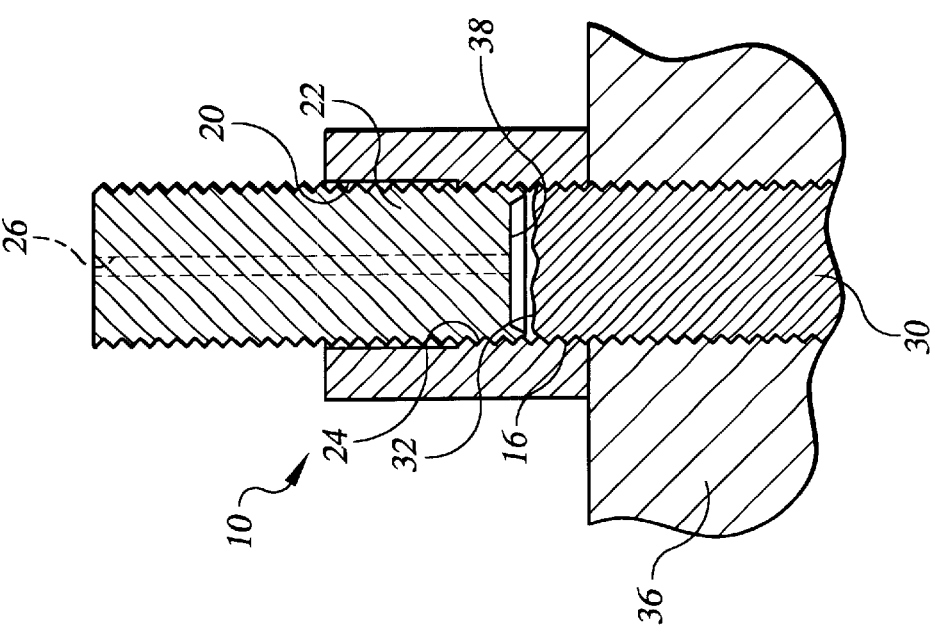
FIG. 6 shows, in section, the use of the shaft and collar to remove a bolt which has broken off flush with the surrounding surface.
Figure 8:
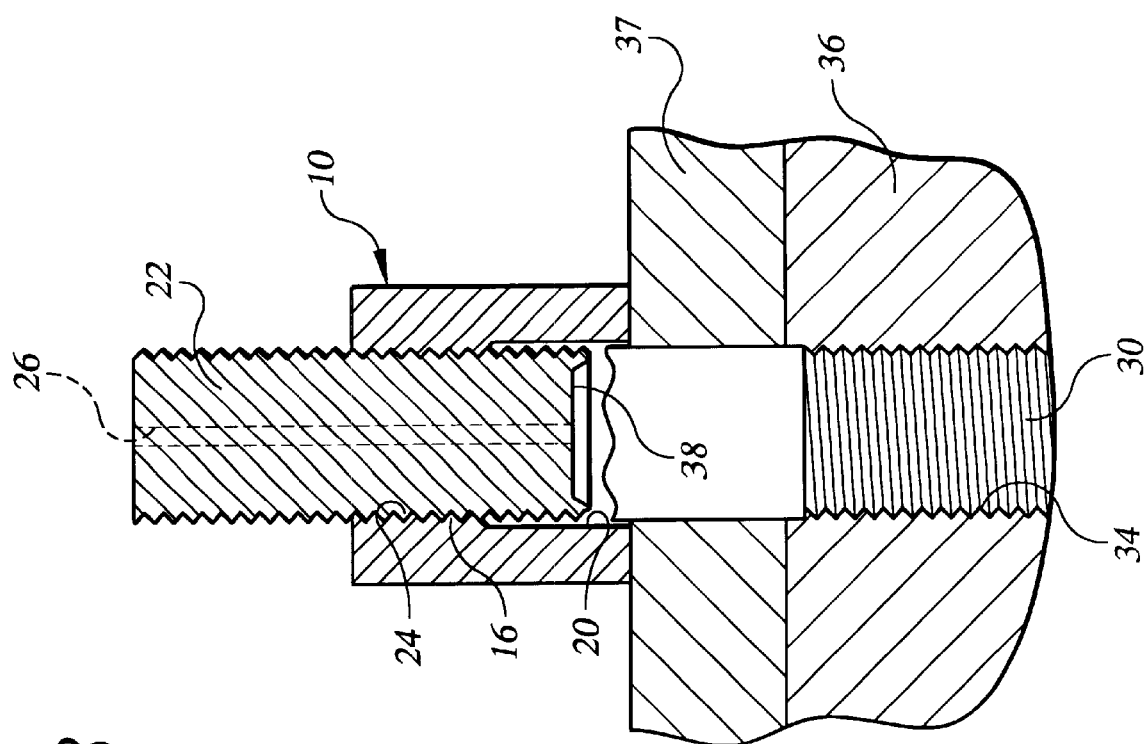
FIG. 8 shows, in section, the use of the shaft and collar to remove a bolt which has broken off above the surrounding surface, leaving a projecting remnant which has an exposed smooth shank portion of the bolt.

The collar and shaft assembly of this invention is thus useful for the removal of bolts which have been broken off so that the broken face 32 is essentially flush with the adjacent surface, FIG. 6.

Figure 7:
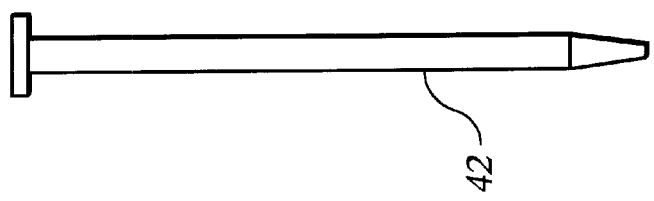
FIG. 7 is a side plan view of the aligning pin which is received in the first hole drilled into the face of the bolt through only one of the longitudinal holes in the shaft.

Another embodiment is illustrated in FIG. 7 where the bolt remnant is a threadless shank portion projecting above the surrounding surface. In this case, the collar 10 is used so that the end having the smooth inside walls 20 is simply slipped over the remnant.

It is to be understood that the present invention uses a plurality of off-center holes drilled through the face of the broken large stud or bolt. While a drilled center hole alone is inadequate for removing large broken studs or bolts, it is also contemplated herein that the plurality of off-center holes can be optionally supplemented by the addition of a center hole drilled into the stud or bolt, as has been disclosed in the cited prior art. The drilled center hole can be enabled by either using the prior art tool or by the provision of a center hole in the shaft of the tool of this invention.

The following are the claims.

What is claimed is:

1. A tool for centering a drill or punch on the broken face of a large stud or bolt and for using the tool to break up and remove a large stud or bolt which comprises a collar having a central bore therethrough having a first portion threaded to mate with the stud or bolt threads and a second portion bored to just slide over the stud or bolt threads and an externally threaded cylindrical shaft which is threadably receivable in the collar, said threads being similar to those of the broken stud or bolt, the shaft having extending longitudinally therethrough a plurality of approximately symmetrically arrayed off-center holes, said holes being adapted to slidably receive an alignment pin or drill bit, said off-center holes being essentially equidistant from the center of the shaft and the inside of said external threads.

2. The tool of claim 1 wherein said off-center holes number from 3 to 9.

3. The tool of claim 1 wherein said off-center holes are three in number.

4. The tool of claim 3 wherein said off-center holes are displaced from each other by about 120°.

5. The tool of claim 1 wherein said large stud or bolt is from about ½ inch to 3 inches or more in diameter.

6. A method of removing a large broken stud or bolt from a bore by placing the collar having a central bore therethrough having a first portion threaded to mate with the stud or bolt threads and a second portion bored to just slide over the stud or bolt threads over a broken bolt having a face projecting above the surrounding surface, said bolt having exposed threads, inserting an externally threaded shaft into said collar, said shaft having a plurality of approximately symmetrically arrayed off-center longitudinal holes therethrough, slidably inserting a drill bit through one of said holes and drilling into the face of said bolt, inserting an alignment pin in the first hole drilled, and then drilling additional holes into the face of the bolt through other of the off-center holes, removing said collar and shaft, enlarging the drilled holes, and inserting a punch into the bolt to break up the remains of the bolt to collapse the remains, and removing the remains.

7. A method of removing a large broken stud or bolt from a bore by placing the collar having a central bore therethrough having a first portion threaded to mate with the stud or bolt threads and a second portion bored to just slide over the stud or bolt threads over a broken bolt having a face projecting above the surrounding surface, said bolt having an exposed smooth shank, inserting an externally threaded shaft into said collar, said shaft having three approximately symmetrically arrayed, off-center longitudinal holes therethrough, slidably inserting a drill bit through one of said holes and drilling into the face of said bolt, inserting an alignment pin in the first hole drilled, and then drilling the second and third holes into the face of the bolt, removing said collar and shaft, enlarging the drilled three holes, and inserting a punch into the bolt to break up the remains of the bolt to collapse the remains, and removing the remains.

8. A method of removing a large broken stud or bolt from a bore by placing the collar having a central bore therethrough having a first portion threaded to mate with the stud or bolt threads and a second portion bored to just slide over the stud or bolt threads over a broken bolt having a face recessed below the surrounding surface, inserting an externally threaded shaft into said collar, said shaft having three approximately symmetrically arrayed, off-center longitudinal holes therethrough, slidably inserting a drill bit through one of said holes and drilling into the face of said bolt, inserting an alignment pin in the first hole drilled, and then drilling the second and third holes into the face of the bolt, removing said collar and shaft, enlarging the three drilled holes, and inserting a punch into the bolt to break up the remains of the bolt to collapse the remains, and removing the remains.

9. A method of removing a large broken stud or bolt from a bore by placing the collar having a central bore therethrough having a first portion threaded to mate with the stud or bolt threads and a second portion bored to just slide over the stud or bolt threads over a broken bolt having a face essentially flush with the surrounding surface, inserting an externally threaded shaft into said collar, said shaft having three approximately symmetrically arrayed, off-center longitudinal holes therethrough, slidably inserting a drill bit through one of said holes and drilling into the face of said bolt, inserting an alignment pin in the first hole drilled, and then drilling the second and third holes into the face of the bolt, removing said collar and shaft, enlarging the three drilled holes, and inserting a punch into the bolt to break up the remains of the bolt to collapse the remains, and removing the remains.

* * * * *